United States Patent [19]

Beiter et al.

[11] 4,030,131

[45] June 14, 1977

[54] SLACK TAPE LOADER

[75] Inventors: Glenn A. Beiter, Louviers; Donald A. Evert, Littleton, both of Colo.

[73] Assignee: Honeywell Inc., Minneapolis, Minn.

[22] Filed: Aug. 20, 1975

[21] Appl. No.: 606,231

[52] U.S. Cl. .............................. 360/71; 242/75.51; 242/190; 318/7

[51] Int. Cl.² .................. G11B 15/43; B65H 59/38

[58] Field of Search .................. 360/71, 69, 73–74; 318/6–7; 242/75.51, 190, 203, 185, 184, 183, 206

[56] References Cited

UNITED STATES PATENTS

| | | | |
|---|---|---|---|
| 2,909,337 | 10/1959 | Lahti et al. | 360/71 |
| 3,317,679 | 5/1967 | Rank | 360/71 |
| 3,318,544 | 5/1967 | Jones, Jr. | 242/190 |
| 3,389,869 | 6/1968 | Atsumi | 242/190 |
| 3,462,659 | 8/1969 | Lee | 242/75.51 |
| 3,606,201 | 9/1971 | Petusky | 242/190 |
| 3,648,950 | 3/1972 | Grabl | 242/75.51 |
| 3,718,289 | 2/1973 | Alaimo | 242/190 |
| 3,734,426 | 5/1973 | Howes et al. | 242/190 |
| 3,829,038 | 8/1974 | Studer | 242/190 |

*Primary Examiner*—Alfred H. Eddleman
*Attorney, Agent, or Firm*—Laurence J. Marhoefer; Lockwood D. Burton; Mitchell J. Halista

[57] ABSTRACT

A slack tape loader for a tape transport apparatus has a signal generator selectively energized by a tape loading control switch to produce an enabling signal for a reel motor control servo circuit. The enabling signal has a duration which will energize the reel motor control servo for a short period of time to load the slack tape on tape storage reels. Concurrently, the tape transport is operative to detect a tensioned state of the tape. The enabling signal is recurrently produced by the signal generator in response to the tape loading control switch until the desired tape tension is detected by a tape tension sensing means to produce an output signal for disabling the signal generator.

10 Claims, 1 Drawing Figure

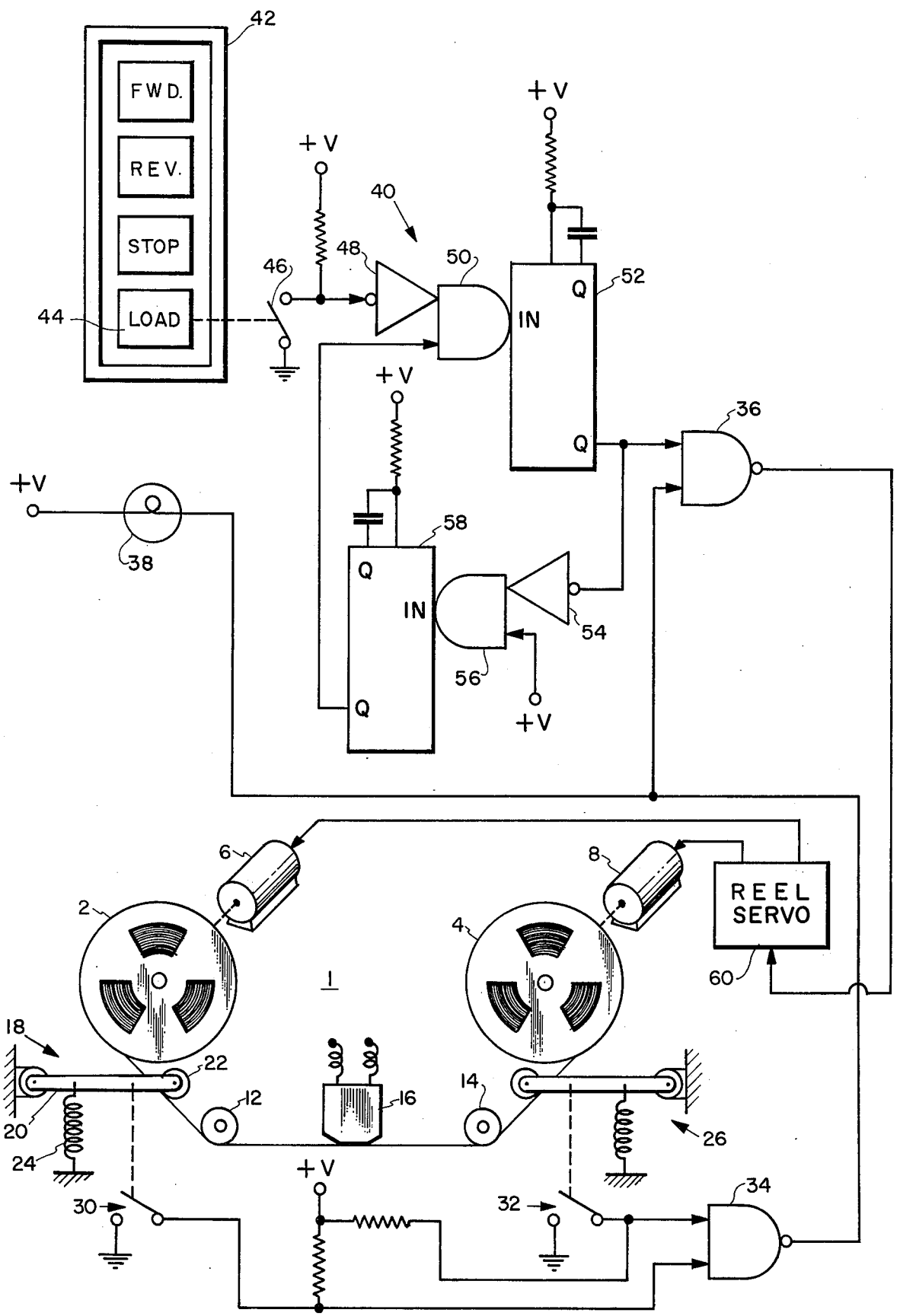

SLACK TAPE LOADER

BACKGROUND OF THE INVENTION

1. Field of the Invention

The present invention relates to tape recorders. More specifically, the present invention is directed to a circuit for gently loading slack tape onto the tape storage reels.

2. Description of the Prior Art

The operation of a tape recorder often involves the necessity for transferring a recording tape in a slack, or untensioned, state to a tensioned state between the tape supply and take-up reels. The loss of tape tension or the occurrence of a slack state of the recording tape may be occasioned by a fault in the operation of the tape transport, a changeover from one tape to another, a power failure etc. In order to restore the tape recorder to an operable state from such a slack tape condition, it is desirable to minimize damage to the tape particularly when the tape recorder is installed in a location remote from the operator and its operation is not directly observable by the operator. While a small loss of tape tension may be overcome by simply normally operating the tape servo control circuit in the tape transport system, a substantial loss of tension, or a considerable slack in the tape, which is normally present as a result of a power failure or other fault condition occurring when the tape recorder has been running cannot be so easily rectified. The problem is particularly acute in most portable recorders which are restricted to the use of short throw tension arms for sensing the tension in the recording tape as a result of space limitations in the tape recorder whereby they do not have substantial storage capacity for the excess, or slack, tape in their transport systems. Thus, the tape and tape reel velocities must be limited as the slack tape is spooled back onto the tape storage reels to prevent tape damage when the tension arm reach the end of their travel as a result of a restoration of the normal tape tension. Accordingly, it is desirable to provide a slack-tape loading circuit for selectively operating the tape transport in the event of a loss of tape tension, which is effective to spool the slack-tape back onto the tape reels without damaging the tape.

SUMMARY OF THE INVENTION

An object of the present invention is to provide an improved tape transport system having a slack-tape loading control means for the tape transport to prevent damage to the recording tape during spooling of the slack tape onto the tape storage reels.

In accomplishing this and other objects, there has been provided, in accordance with the present invention, a tape transport having a reel motor servo control system and a manually operable tape loading circuit for initiating and controlling the spooling of a slack tape onto the tape storage reels by a selective control of the reel motor servo control system. The slack-tape loading control circuit includes a signal generator arranged to produce an output signal having a predetermined duration which is used to enable the reel motor servo system to spool the slack tape onto the tape storage reels. The signal generator is successively operated until a tensioned state in the recording tape is sensed by a tape tension sensing means. The tape tension sensing means is connected to a disabling circuit for the signal generator to terminate the signal generator output signal to prevent further spooling of the tape onto the tape storage reels after a tensioned condition of the tape is detected.

BRIEF DESCRIPTION OF THE DRAWING

A better understanding of the present invention may be had when the following detailed description is read in connection with the accompanying drawing in which the single FIGURE is a block diagram illustration of a slack-tape loading control circuit embodying the present invention.

DESCRIPTION OF THE PREFERRED EMBODIMENT

Detailed Description

Referring to the single FIGURE drawing in more detail, there is shown a tape transport 1 having a first tape storage reel 2 and a second tape storage reel 4. In a particular drive mode, the first tape storage reel 2 may be used as a take-up reel and the second tape storage reel 4 may be used as a tape supply reel. The first tape storage reel 2 is driven by a first tape reel motor 6. Similarly, the second tape reel 4 is driven by a second tape reel motor 8. A recording medium, e.g., recording tape 10, is guided between the first tape reel 2 and a second tape reel 4 by a pair of guide rollers 12 and 14. A recording head 16 may be positioned between the rollers 12 and 14 and in operative engagement with the recording tape.

A first tension detecting means 18 is located adjacent to the first storage reel 2 to detect tape tension in the recording tape 10. The tape-tension detecting means 18 may include a pivoted arm 20 having a roller 22 rotatably supported at one end thereof and in contact with the tape 10. The arm 20 may be spring loaded by a spring 24 to maintain the roller 22 in contact with the tape 10. Similarly, a second tape tension detecting means 26 is provided adjacent to the second tape storage reel 4 and may be of a similar structure as the first tape-tension detecting means 18. The first tape-tension detecting means 18 and the second tape-tension detecting means 26 are arranged to operate respective electrical switches 30 and 32. The switches 30 and 32 are arranged to provide respective input signals to a first NAND gate 34. Specifically, one side of each of the switches 30 and 32 is connected to a ground return path while the other side is connected to a bias signal source +V. An output signal from the first NAND gate 34 is applied as a first input signal to a second NAND gate 36 and is used as an enerigizing signal for an indicator light 38. A second input signal for the second NAND gate 36 is obtained from a signal generator circuit 40.

The signal generator circuit 40 is controlled by a push button on a tape transport control panel 42 identified as a "Load" push button. The "Load" push button is connected to an electrical switch 46. The other push buttons on the control panel 42 are connected to conventional circuitry for operating the tap transport, which operation does not form a part of the present invention. The switch 46 is connected to the input of a logical inverter 48 and is arranged to selectively connect the input of the logical inverter 48 either to a common, or ground return, path or a bias signal source +V. The output signal of the logical inverter 48 is applied as a first input of a first AND gate 50. The output signal of the first AND gate 50 is applied to the input of a first monostable multivibrator circuit 52. An output signal from the $\overline{Q}$ output of the multivibrator 52 is applied as a second input signal to the second NAND gate 36. Further, the $\overline{Q}$ output signal is applied through a second logical inverter 54 and a second AND gate 56 to the input of a second monostable multivibrator 58. An output from the second multivibrator 58 is applied as a second input to the first AND gate 50. The output signal from the second NAND gate 36 is used as an enable signal for a reel motor control servo system 60 to control the drive of the reel motor 6 and 8. The servo system 60 may be any suitable motor control circuit for driving the reel motors 6 and 8 during the presence of the enabling signal from the signal generator 40.

MODE OF OPERATION

Assuming that a slack condition is present in the recording tape 10, the tape tension detecting means 18 and 26 are positioned in a retracted, state which position is effective to close the switches 30 and 32, respectively. The closed state of the switches is effective to allow output signals from the signal generator 40 to be applied as enabling signals to the motor servo control circuit 60. If, at this time, the signal generator 40 is actuated by an operation of the "Load" push button on the control panel 42 to produce an enabling signal for the reel servo control system 60. This enabling signal to the reel servo 60 controls the momentary operation of the reel motors 6 and 8 to spool a portion of the slack tape onto the tape storage reels 2 and 4 for the duration of the enabling signal. If at the end of the enabling signal, the tension detecting means 18 and 26 are not actuated by the tape 10 to open the switches 30 and 32, which is an indication that all the slack has been removed from the recording tape 10, another enabling signal is generated by the signal generator 40 for the reel motor servo system 60 to produce a further short interval of spooling of the recording tape 10. To prevent undesired high velocities of the recording medium 10 and the storage reels 2 and 4, the signal generator 40 is provided with a time delay to prevent a generation of a succeeding enabling pulse for the reel servo system 60 for a predetermined period of time. However, as long as the tension detecting means 10 and 26 retain the switches 30 and 32 in a closed state and the switch 46 is kept closed, a series of enabling pulses for the reel servo 60 is generated by the signal generator 40, and the slack recording medium 10 is intermittently spooled at a slow speed onto the tape reels 2 and 4. When the tension detecting means 18 and 26 detect that the slack has been removed from the recording medium 10, the switches 30 and 32 are opened and the further generation of enabling signals for servo control circuit 60 from the signal generator 40 is inhibited. Further, the light 38 is enabled as a "Ready" light to indicate that a normal operation of the tape transport system may be resumed.

Specifically, the closing of the Load switch 46 by an operator is effective to produce a high level signal at the output of the logical inverter 48 to be applied to the input of the first AND gate 50. The second input signal to the AND gate 50 is obtained from the $\overline{Q}$ output of the second multivibrator 58 and is a high level signal during the time that the second multivibrator 58 is in a stable, i.e., non-energized state. The output signal of the AND gate 50 produced by the two high level input signals is a high level signal which is applied to trigger the first multivibrator 52. The output signal from the first multivibrator 52 is taken from the $\overline{Q}$, or low level, side during the energization of the first multivibrator 52. This low level signal is applied to the first input of the second NAND gate 36. The closed state of the switches 30 and 32 is effective to produce a high level output signal from the first NAND gate 34. The high level output signal from the first NAND gate 34 is applied to the second input of the second NAND gate 36 to produce a high level output from the second NAND gate 36 representing its high and low input signals for application as an enabling signal to the reel servo control circuit 60. The duration of this enabling signal from the signal generator 40 is determined by the RC circuit constants associated with the first monostable multivibrator 52 as is well-known in the prior art. Thus, the reel servo control circuit 60 is enabled for a period of time determined by the duration of the low $\overline{Q}$ output signal from the signal generator 40. At the end of the enabling signal from the signal generator 40, the reel servo control circuit 60 is deenergized to stop the reel motors 6 and 8.

The output signal from the multivibrator 52 is also applied through a local inverter 54 and gate 56 as an enabling signal to the input of the second multivibrator 58. The duration of the resulting output signal from the second monostable multivibrator 58 is also determined by the RC circuit constant associated with the second multivibrator 58. The output signal from the second multivibrator 58 is applied to the first AND gate 50 as an inhibit signal to prevent further triggering of the first multivibrator 52 by the "loac " switch 46. If the switch 46 is still closed at the termination of the inhibit output signal from the second multivibrator 58 and the switches 30 and 32 remain closed, the first multivibrator 52 is again enabled to produce another output signal from the signal generator 40 for application to the reel servo control circuit 60. Thus, the reel servo control circuit 60 is periodically enabled by the signal generator 40 to produce corresponding short durations of operation of the reel motors 6 and 8 to slowly spool the slack tape 10 onto the storage reels 2 and 4. The output signals generated by the multivibrators 52 and 58 are selected to prevent high reel velocities when large loops of slack tape are present, e.g., the enabling signal from the first multivibrator 52 may be approximatey 100ms duration whereupon the corresponding inhibiting signal from the second multivibrator 58 would be approximately of 1 second duration.

When the slack tape is ultimately loaded onto the storage reels 2 and 4 and tensioned by the reel motors 6 and 8, the tension sensing means 18 and 26 are effective to sense the restoration of tension in the tape 10 by opening either or both of the switches 30 and 32. The opening of either or both of switches 30 and 32 is effective to switch the low level input signals to the first NAND gate 34 to a high level input signal, i.e., +V. This high level signal is applied to the first NAND gate 34, in turn, to switch the high level output signal from the NAND gate 34 to a low level output signal. This low level output signal the NAND gate 34 is applied to the second NAND gate 36 where it is effective to produce a continuous high level output signal from the second NAND gate 36. This operation of the NAND gate 36 inhibits the effect of any further output signals from the multivibrator 52. Further, the low output from the first NAND gate 34 lights the Ready light 38 by providing a return path for the source +V through the light 38. The continuous high output level from the second NAND gate 36 is applied to the servo control 60 to institute a normal operation thereof while the energization of the light 38 serves to inform the operator that the slack tape loading operation has been completed. Of course, the slack tape loading operation can be terminated by the operator by means of the Load switch 46. Thus, if the switch 46 is opened, a high output signal, i.e., +V, is applied to the logical inverter 48 to be inverted to a low level signal for application to the AND gate 50. This low level input signal to the AND gate 50 is effective to prevent a triggering of the first multivibrator 52 by maintaining a low level output signal at the output of the AND gate 50 for application to the input of the first multivibrator 52. However, if the tape 10 has not been returned to a tensioned state, the switches 30 and 32 are retained in a closed state and the normal operation of the reel servo circuit 60 is prevented, as described above.

Accordingly, it may be seen that there has been provided, in accordance with the present invention, a tape transport system having a slack tape loading control means for spooling of slack tape onto the tape storage reels.

The embodiments of the invention in which an exclusive property or privilege is claimed are defined as follows:

1. A tape transport control system comprising
a pair of tape storage reels,
a pair of reel drive motors for driving respective ones of said storage reels,
a reel motor control system connected to said drive motors to supply energizing signals thereto,
means for detecting a slack condition in a tape driven by the tape transport between said storage reels to supply signals representative of said slack condition, and
selectively operable signal generator means responsive to said signals from said last-mentioned means and connected to said reel motor control system for providing a selectively operable signal generating capability to produce a succession of control signals for said reel motor control system with each control signal having a predetermined duration for energizing said reel motor control system for said predetermined duration to drive said reel motors to remove said slack condition in said tape.

2. A tape transport control system as set forth in claim 1 wherein said means for detecting includes means in contact with the tape and a switch means responsive to said last-mentioned means to produce a first output signal representative of a slack tape and a second output signal representative of a tensioned tape.

3. A tape transport control system as set forth in claim 2 wherein said first output signal is applied to said signal generator means to enable the generation of said control signals and said second output signal is applied to said signal generator means to inhibit the generation of said control signals.

4. A tape transport control system as set forth in claim 1 wherein said signal generator means includes a first signal producing means for producing output signals each having said predetermined duration as said control signals and a second signal producing means connecting to said first signal producing means and responsive to said output signal to produce an inhibit signal having a predetermined duration and means connecting an output of said second signal producing means to said first signal producing means to apply said inhibit signal to said first signal producing means to inhibit operation of said first signal producing means during the duration of said inhibit signal to introduce a predetermined interval between said output signals.

5. A tape transport control system as set forth in claim 4 wherein said signal generator means includes a manually operable switch means connected to said first signal producing means effective upon actuation to induce the production of said output signals by said first signal producing means and wherein said second signal producing means is arranged to override the operation of said manually operable switch means to introduce said predetermined interval.

6. A tape transport control system as set forth in claim 4 wherein the duration of each of said control signals is shorter than a predetermined interval between successive ones of said control signals.

7. A tape transport control system as set forth in claim 3 wherein said first and second signal producing means are each multivibrators having predetermined duration output signals.

8. A tape transport control system as set forth in claim 4 wherein said means for detecting includes means in contact with the tape and a switch means responsive to said last-mentioned means to produce a first output signal representative of slack tape and a second output signal representative of a tensioned tape and means for applying said first output signal to said signal generator means to enable the generation of said control signals and said second output signal to said signal generator means to inhibit the generation of said control signals.

9. The tape transport control system as set forth in claim 8 wherein said signal generator means includes a signal gating means for said control signals, first circuit means connecting an output from said first signal producing means to an input of said signal gating means and second circuit means for connecting said second output signal from said means for detecting as an enabling signal for said signal gating means.

10. A tape transport control system as set forth in claim 5 wherein said manually operable switch means is arranged to provide and includes switch output signal a second gating means, circuit means connecting said switch means to said second gating means to apply said switch output signal as an input signal to said second gating means and circuit means connecting an output signal from said second producing means as an enabling signal to said second gating means.

* * * * *

UNITED STATES PATENT OFFICE
CERTIFICATE OF CORRECTION

Patent No. 4,030,131           Dated June 14, 1977

Inventor(s) Glenn A. Beiter et al

It is certified that error appears in the above-identified patent and that said Letters Patent are hereby corrected as shown below:

Claim 4, line 6, change "connecting" to ---connected---;

Claim 10, line 53, change "and includes switch output signal" to ---a switch output signal and includes---;

*Signed and Sealed this*

*Twentieth* Day of *September 1977*

[SEAL]

Attest:

RUTH C. MASON            LUTRELLE F. PARKER
*Attesting Officer*      *Acting Commissioner of Patents and Trademarks*